(12) United States Patent
Marcotte et al.

(10) Patent No.: US 12,179,797 B2
(45) Date of Patent: Dec. 31, 2024

(54) LAYERED ARCHITECTURE FOR AVAILABILITY OF ADVANCED DRIVER ASSISTANCE FEATURES

(71) Applicant: TOYOTA RESEARCH INSTITUTE, INC., Los Altos, CA (US)

(72) Inventors: Ryan Marcotte, Ann Arbor, MI (US); Marcus McCoy Hammond, Redwood City, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 447 days.

(21) Appl. No.: 16/952,852

(22) Filed: Nov. 19, 2020

(65) Prior Publication Data
US 2022/0126865 A1    Apr. 28, 2022

Related U.S. Application Data

(60) Provisional application No. 63/106,633, filed on Oct. 28, 2020.

(51) Int. Cl.
*B60W 50/029*    (2012.01)
*B60W 30/095*    (2012.01)
(Continued)

(52) U.S. Cl.
CPC .... *B60W 60/0015* (2020.02); *B60W 30/0953* (2013.01); *B60W 30/0956* (2013.01);
(Continued)

(58) Field of Classification Search
CPC ......... B60W 60/0015; B60W 30/0953; B60W 30/0956; B60W 50/02; B60W 2420/42; B60W 2420/52; B60W 2420/54; B60W 2510/20; B60W 50/029; B60W 50/035; B60W 2050/0295; B60W 2050/0297; B60W 50/085; B60W 50/082; B60W 60/005

See application file for complete search history.

(56) References Cited

U.S. PATENT DOCUMENTS 9,308,914 B1   4/2016  Sun et al.
9,580,073 B1   2/2017  Nehmad et al.
(Continued)

FOREIGN PATENT DOCUMENTS

DE   102016207277 A1      11/2017
DE   102020117340 A1 *    1/2022

*Primary Examiner* — Daniel M. Robert
(74) *Attorney, Agent, or Firm* — Dinsmore & Shohl LLP

(57) ABSTRACT

A method of controlling availability of autonomy functions of a vehicle includes determining one or more uncertainty levels, each corresponding to a driving data stream including driving data, wherein the uncertainty levels correspond to a probability of a collision or driving off the roadway. The method further includes generating a total uncertainty level based on the one or more uncertainty levels and disabling a first autonomy function based on availability criteria of the first autonomy function. The availability criteria define a first threshold of the total uncertainty level. The method further includes providing a second autonomy function based on the second autonomy function's availability criteria that include a total uncertainty threshold higher than the first threshold.

20 Claims, 6 Drawing Sheets

(51) Int. Cl.
 *B60W 50/02* (2012.01)
 *B60W 60/00* (2020.01)
(52) U.S. Cl.
 CPC ....... *B60W 50/02* (2013.01); *B60W 2420/403* (2013.01); *B60W 2420/408* (2024.01); *B60W 2420/54* (2013.01); *B60W 2510/20* (2013.01)

(56) References Cited

U.S. PATENT DOCUMENTS

| | | |
|---|---|---|
| 10,082,795 B2 | 9/2018 | Zhao et al. |
| 10,339,391 B2 | 7/2019 | Zhao et al. |
| 2019/0113927 A1* | 4/2019 | Englard ................. G06N 5/046 |
| 2020/0189598 A1 | 6/2020 | Eigel et al. |
| 2020/0307561 A1* | 10/2020 | Bush .................... G05D 1/0221 |
| 2020/0339151 A1* | 10/2020 | Batts ................... B60W 60/001 |
| 2021/0116256 A1* | 4/2021 | Konrardy ........... G06Q 10/1095 |
| 2021/0117787 A1* | 4/2021 | Stal ........................... G06N 3/04 |
| 2021/0362733 A1* | 11/2021 | Yoon ....................... H04W 4/40 |
| 2022/0128700 A1* | 4/2022 | Saranin ................... G06T 7/162 |

\* cited by examiner

LAYERED ARCHITECTURE FOR AVAILABILITY OF ADVANCED DRIVER ASSISTANCE FEATURES

TECHNICAL FIELD

The present specification generally relates to autonomous functions for vehicles and, more specifically, a layered architecture of autonomous functions that are activated or deactivated in a vehicle based on reliability or availability of information or data required by those autonomous functions.

BACKGROUND

Autonomous vehicles may include a variety of separate autonomous functions, each of which is dependent upon certain vehicle sensors or other data. For example, a parking assist feature may depend on a rear camera and sonar sensors, while an adaptive cruise control feature may depend on RADAR data. Some advanced autonomous functions, such as lane keeping, lane changing or autonomous navigation, may require robust data from a variety of different data sources. When required sensor data is unavailable, or insufficient to safely support an autonomous function, a malfunction may occur, potentially resulting in collision, injury, or property damage.

Accordingly, a need exists for systems and methods of a layered architecture of autonomous functions that are activated or deactivated in a vehicle based on reliability or availability of information or data required by those autonomous functions.

SUMMARY

In one embodiment, a method for controlling availability of autonomy functions of a vehicle may include determining one or more uncertainty levels, each corresponding to a driving data stream including driving data. The uncertainty levels may correspond to a probability of an undesirable outcome. The method may further include generating a total uncertainty level based on the one or more uncertainty levels, disabling a first autonomy function based on availability criteria of the first autonomy function. The availability criteria define a first threshold of the total uncertainty level.

In another embodiment, the availability criteria may further define a second threshold of an uncertainty level corresponding to at least one of the driving data streams, and the disabling of the first autonomy function is performed in response to at least one of the first threshold or the second threshold being triggered.

In yet another embodiment, the method further includes providing a second autonomy function based on the second autonomy function's availability criteria that include a total uncertainty threshold higher than the first threshold.

In yet another embodiment, the generating of a total uncertainty level includes projecting the driving data of each driving data stream into an occupancy grid. The occupancy grid represents physical space within a range of a vehicle sensor The generating of a total uncertainty level may further include creating an uncertainty map by convolving the uncertainty level corresponding to each driving data stream with the occupancy grid and combining uncertainty levels in a path of the vehicle in the uncertainty map to produce the total uncertainty level.

In yet another embodiment, the combining includes one or more of weighted averaging, multiplication, or summation.

In yet another embodiment, the undesirable outcome comprises a collision or leaving a roadway.

In yet another embodiment, the driving data comprises one or more of sensor data, map data, trajectory data, or location data, and sensor data comprises camera data, image device data, audio data, sonar data, LIDAR data, RADAR data, obstacle detection data, throttle data, steering data, or any data from a vehicle sensor.

Systems and computer-readable media of the disclosed embodiments may perform the above methods or include instructions that, when executed by a processor cause the processor to perform the above methods. These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

According to embodiments described herein, autonomous functions include availability criteria defining data requirements and an uncertainty level corresponding to the data requirements. According to embodiments, an uncertainty level may correspond to a probability of collision or driving off the road. When the uncertainty level triggers a threshold defined by the availability criteria, the corresponding autonomous function may be disabled in order to prevent autonomous driving maneuvers with unacceptable levels of risk. According to embodiments, autonomous functions are implemented in a layered hierarchy, where different autonomous functions have different availability criteria. Autonomous functions may provide different levels of related services ranging from basic to advanced, depending on whether the requirements of corresponding availability criteria are met. Advanced autonomous functions may be disabled in response to a high uncertainty level in the required data, while basic autonomous functions, with less stringent data requirements, remain enabled.

As a non-limiting example, for illustration purposes only, a set of autonomous functions may be related to an adaptive cruise control driver assistance feature. Adaptive cruise control may include a lane keeping autonomous function and a following distance autonomous function. The availability criteria of the lane keeping autonomous function may include an uncertainty level threshold for image data of the road. The availability criteria of the following distance autonomous function may include an uncertainty level threshold for RADAR data. If a camera providing image data of the road become dirty and provides poor image quality, the lane keeping autonomous function may be disabled while the following distance autonomous function remains enabled. If an uncertainty level corresponding to the RADAR data triggers a threshold for the following distance autonomous function, the following distance autonomous function may be disabled while the lane keeping function remains enabled. If uncertainty levels for both RADAR data and image data of the road trigger their respective uncertainty levels defined in the availability criteria for the following distance autonomous function and the lane keeping autonomous function, adaptive cruise control may be disabled entirely, while basic cruise control, for maintaining a fixed speed, remains enabled.

Figure 1:
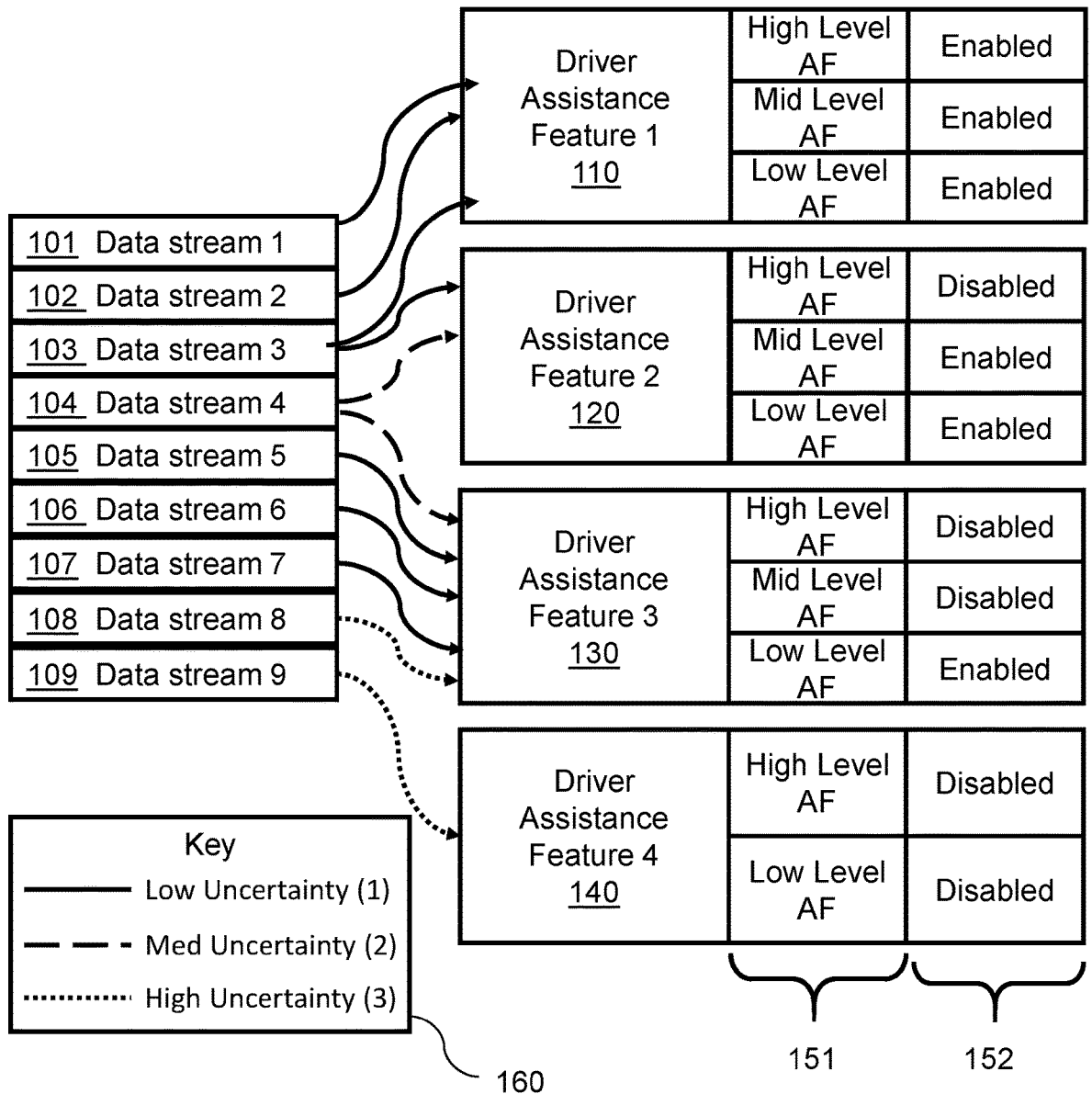
FIG. 1 depicts a block diagram illustrating various driver assistance features with different levels of autonomous functions that are enabled or disabled based on uncertainty levels of data streams used by the autonomous functions, according to one or more embodiments shown and described herein.

FIG. 1 depicts a block diagram illustrating various driver assistance features with different levels of autonomous functions that are enabled or disabled based on uncertainty levels of data streams used by the autonomous functions, according to one or more embodiments shown and described herein. As shown in FIG. 1, various driving data streams 101-109 feed into driver assistance feature 1 110, driver assistance feature 2 120, driver assistance feature 3 130, and driver assistance feature 4 140. Driving data streams 101-109 may include driving data of one or more vehicles, including but not limited to an ego vehicle. Driving data may include, but is not limited to, sensor data, map data, trajectory data, location data, observation data, motion prediction data, localization data, vehicle position information, or vehicle speed information. Sensor data may include, but is not limited to, one or more of camera data, image device data, audio data, sonar data, LIDAR data, RADAR data, obstacle detection data, throttle data, steering data, or any data from a vehicle sensor. Embodiments described herein are not limited to any particular type of sensor data or driving data and one of ordinary skill in the art would understand that any data generated or used by autonomous vehicles may be used by the disclosed embodiments in controlling the availability of autonomous functions.

For non-limiting illustrative purposes only, each driver assistance feature 110, 120, 130, 140 may use one or more driving data streams 101-109 and each driver assistance feature 110, 120, 130, 140 may comprise a set of autonomous functions 151. For non-limiting illustrative purposes, a set of autonomous functions may include a high level autonomous function, a mid-level autonomous function, and a low level autonomous function. According to some embodiments, a set of autonomous functions may include a high level autonomous function and a low level autonomous function. According to some embodiments, driver assistance features may comprise more or fewer autonomous functions. According to some embodiments, some driver assistance features may use only a single autonomous function. Each autonomous function in FIG. 1 includes a status 152 that may be enabled or disabled. According to some embodiments, each autonomous function 151 associated with a driver assistance feature 110, 120, 130, 140 may be enabled or disabled based on an uncertainty level of one or more driving data streams 101-109.

Each data stream 101-109 used by a driver assistance feature 110, 120, 130, 140 is indicated by an arrow connecting the driving data streams 101-109 to the driver assistance feature 110, 120, 130, 140. A key 160 in FIG. 1 shows that a solid line indicates a low uncertainty level corresponding to the driving data streams 101-109, a dashed line indicates a medium uncertainty level, and a dotted line indicates a high uncertainty level. The key 160 also includes a numerical representation of each uncertainty level where low uncertainty is given a value of 1, medium uncertainty is given a value of 2, and high uncertainty is given a value of 3. A person of ordinary skill in the art will understand that uncertainty levels can be represented categorically (low, med, high) or numerically (1, 2, 3), including probabilistic representations P=[0, 1] according to any categorical or numerical system without departing from the spirit and scope of the disclosed embodiments.

As illustrated in FIG. 1, driver assistance feature 1 110 uses driving data stream 1 101, driving data stream 2 102, and driving data stream 3 103. Each of these driving data streams has a low uncertainty level, and each of the high level autonomous function, mid-level autonomous function, and low level autonomous function has a status 152 of enabled. As further illustrated, driving data stream 3 103 and driving data stream 4 are each used by more than one driver assistance feature 110, 120, 130, 140. According to some embodiments, some driving data streams may be used in any number of driver assistance features 110, 120, 130, 140.

Driver assistance feature 2 120 uses driving data stream 3 103 and driving data stream 4 104. Although driving data stream 3 103 has a low uncertainty level, driving data stream 4 104 has a medium uncertainty level. As a result, according to this non-limiting example, the high level autonomous function of driver assistance feature 2 120 has a status 152 of disabled while the mid-level autonomous function and low-level autonomous function have a status 152 of enabled.

Driver assistance feature 3 130 uses driving data stream 4 104, driving data stream 5 105, driving data stream 6 106, driving data stream 7 107 and driving data stream 8 108. Although driving data streams 5, 6 and 7 105-107 have a low uncertainty level, driving data stream 4 104 has a medium uncertainty level, and driving data stream 8 108 has a high uncertainty level. As a result, according to this non-limiting example, the high level autonomous function and mid-level autonomous function of driver assistance feature 2 120 have a status 152 of disabled while the low-level autonomous function has a status 152 of enabled. The availability criteria, including uncertainty level thresholds for the autonomous functions 151 of driver assistance feature 3 are described in greater detail with reference to FIG. 2.

Driver assistance feature 4 140 is uses driving data stream 9 109. As a non-limiting illustrative example, the autonomous functions 151 of driver assistance feature 4 include only a high level autonomous function and a low level autonomous function. As indicated by the dotted line connecting driving data stream 9 109 to driver assistance feature 4 140, driving data stream 9 109 has a low uncertainty level. As a result, according to this non-limiting example, both the high level and mid-level autonomous functions 151 of driver assistance feature 4 140 are disabled 152. As a non-limiting example, the high level autonomous function of driver assistance feature 4 140 may require a low uncertainty level in order to function reliably, and the low level autonomous function may require at least a medium uncertain level in order to function reliably. Thus, the requirements of the high level and low level autonomous functions 151 are not met for driver assistance feature 4 104. According to some embodiments, the requirements of each autonomous function 151 may be defined by availability criteria corresponding to each autonomous function. Availability criteria are described in greater detail with reference to FIG. 2.

Figure 2:
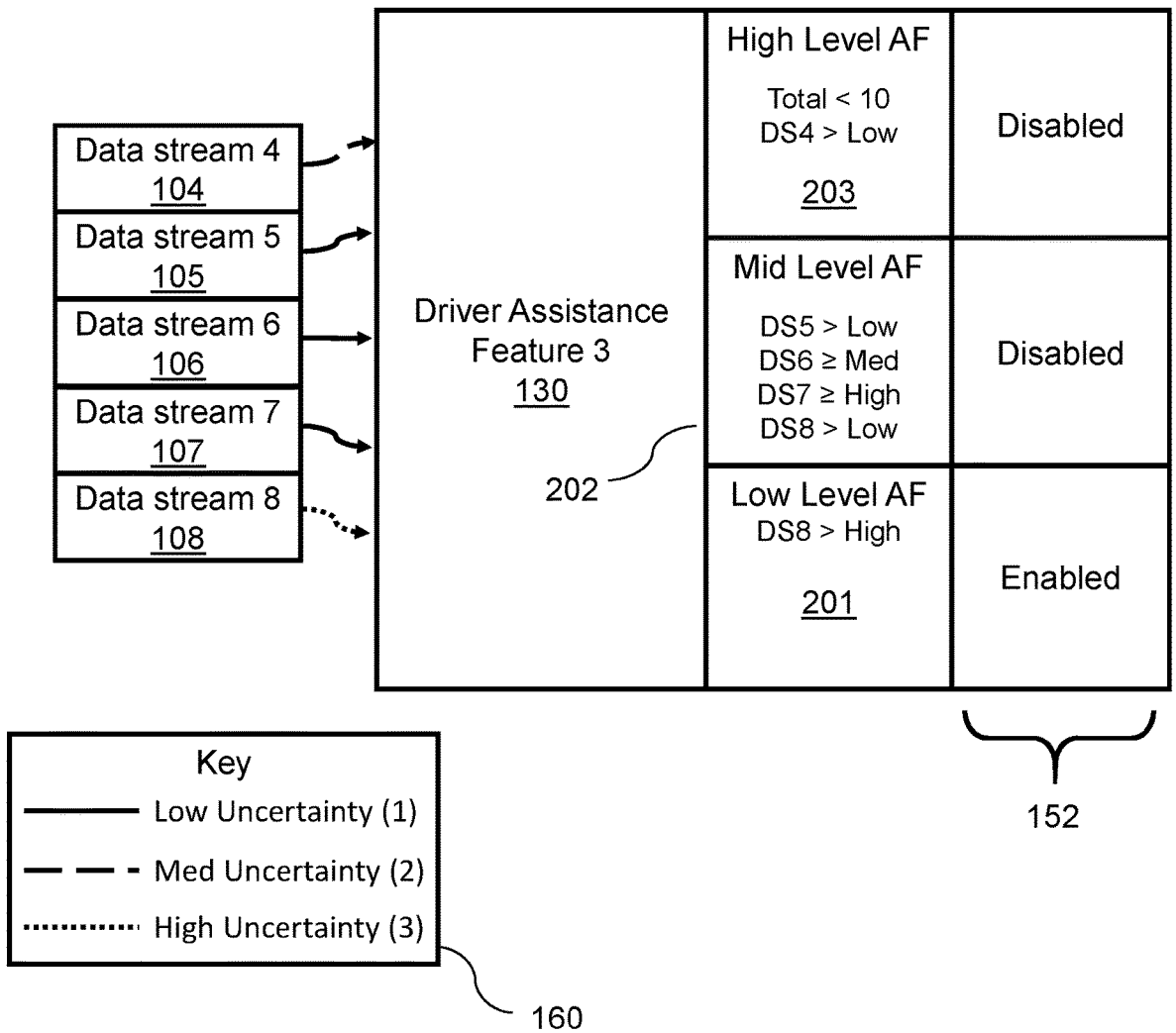
FIG. 2 depicts a block diagram of a driver assistance feature and detailed availability criteria for various autonomous functions that rely on a set of data streams, according to one or more embodiments shown and described herein.

FIG. 2 depicts a block diagram of a driver assistance feature and detailed availability criteria for various autonomous functions that rely on a set of data streams, according to one or more embodiments shown and described herein. Each driving data stream 104-108 used by driver assistance feature 3 130 is illustrated with a line from the driving data stream 104-108 to driver assistance feature 3 130. The uncertainly level corresponding to each driving data stream is indicated by a solid, dashed, or dotted line. The key 160 shows that a solid line indicates a low uncertainty level with a value of 1, a dashed line indicates a medium uncertainty level with a value of 2, and a dotted line indicates a high uncertainty level with a value of 3. According to some embodiments, availability criteria may define a threshold for the total uncertainty of all driving data streams 101-109 used by an autonomous function. According to some embodiments, availability criteria may define a threshold for one or more individual driving data streams 101-109 used by an autonomous function.

Referring to the low-level autonomous function of driver assistance feature 3 130, the availability criteria 201 indicate a threshold of greater than three (3—high uncertainty) for driving data stream 8 108 (DS8>3). According to some embodiments, and as a non-limiting example, a "greater than three uncertainty" threshold may be triggered by data that is unavailable. Because the uncertainty level of driving data stream 8 108 is not greater than three (3—high uncertainty), the availability criteria 201 are satisfied for the low level autonomous function, and the low level autonomous function is enabled. According to embodiments, an autonomous function of a driver assistance feature need not use all driving data streams relevant to the driver assistance feature. As a non-limiting example of this, the low level autonomous function may require driving data only from driving data stream 8 108, while other levels of autonomous functions for the driver assistance feature may require driving data from additional driving data streams 101-109.

Now referring to the mid-level autonomous function of driver assistance feature 3 130, the availability criteria 202 indicate that the mid-level autonomous function requires driving data streams 5 through 8 105-108. According to some embodiments, the availability criteria 202 of a higher level autonomous function may require that each lower level autonomous function be enabled. According to some embodiments, each autonomous function may be enabled or disabled independently of other autonomous functions. The availability criteria 202 indicate a threshold of greater than one (1—low uncertainty) for data stream 5 105 (DS5>1), a threshold of greater than or equal to two (2—medium uncertainly) for data stream 6 106 (DS6≥2), and a threshold of greater than or equal to three (3—high uncertainty) for data stream 7 107 (DS7≥High). Because data streams 5-7 each have an uncertainty level of two (2—low uncertainty), data streams 5-7 do not trigger any thresholds for disabling the mid-level autonomous function. However, the availability criteria 202 for the mid-level autonomous function also include a threshold of greater than one (1—low uncertainty) for data stream 8 108. Because the uncertainty level for data stream 8 108 is three (3—high uncertainty), the threshold for data stream 8 108 is triggered, and the mid-level autonomous function is disabled.

Referring to the high level autonomous function, the availability criteria 203 indicate threshold for total uncertainty of greater than ten (Total>10) and set a threshold of greater than one (1—low uncertainty) for driving data stream 4 104 (DS4>1). According to some embodiments, the total uncertainty may be calculated by a weighted averaging, multiplication, or summation. As a non-limiting example, using a summation of the values for data streams 4 through 8, 104-108, the total uncertainty value equals 8 (Total=8). This total does not trigger the threshold of ten and satisfies the Total>10 requirement in the availability criteria 203. However, because the uncertainty level of two (2—medium uncertainty) for data stream 4 104 triggers the "low uncertainty" threshold (DS4>1) of the availability criteria 203 for the high level autonomous function, the high level autonomous function is disabled.

According to some embodiments, an autonomous function may be enabled in response to all the availability criteria 203 being satisfied. According to some embodiments, an autonomous function may be enabled in response to one or more of the availability criteria 203 being satisfied. According to some embodiments, an autonomous function may be disabled in response to one or more availability criteria being unsatisfied. One of ordinary skill in the art will understand that a threshold may be triggered based on any conditions, including when a value (e.g., uncertainty level) is greater than, less than, greater than or equal to, or less than or equal to the threshold.

Figure 3:
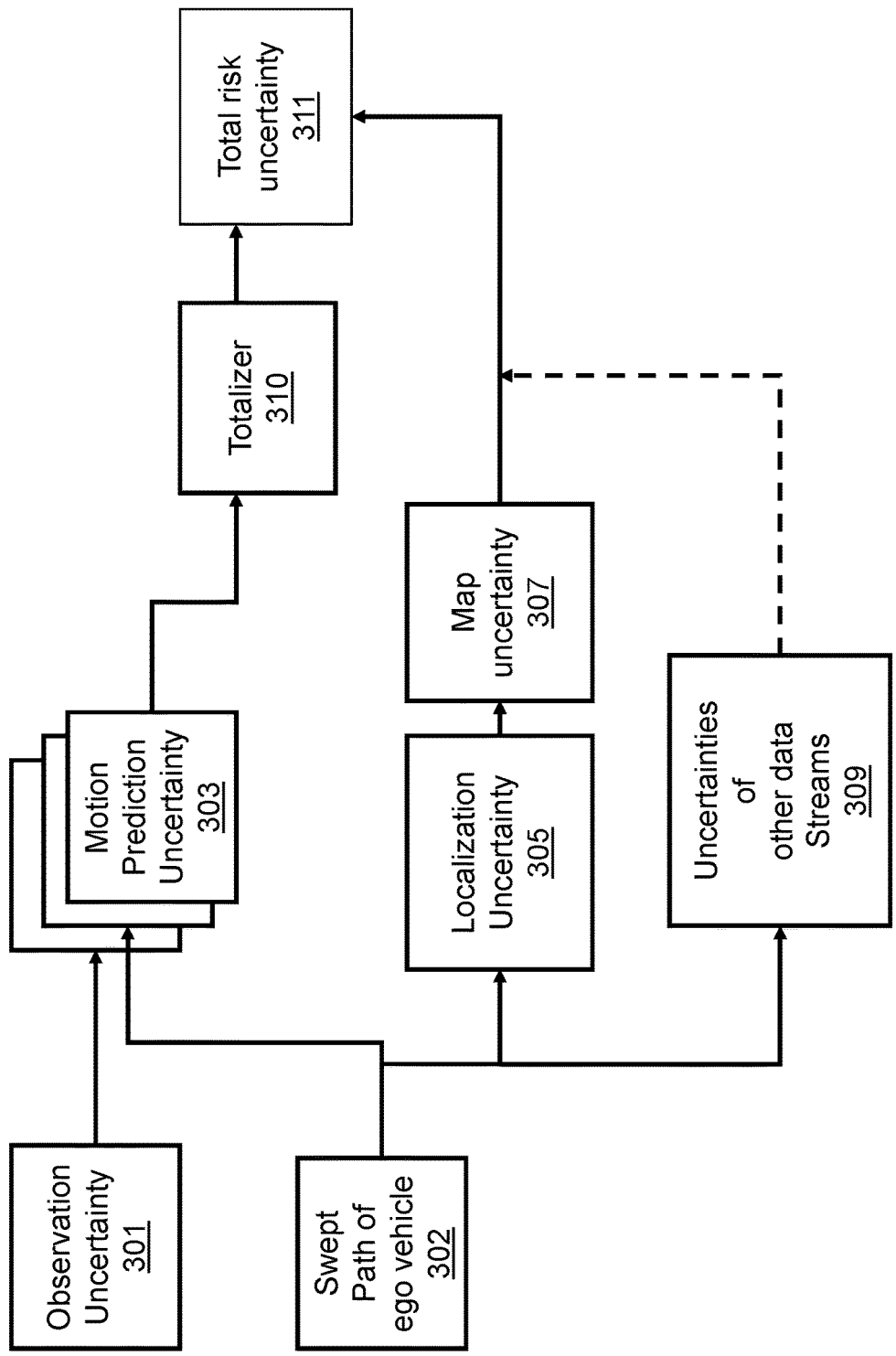
FIG. 3 depicts a block diagram illustrating the combination of uncertainty levels for various data streams, according to one or more embodiments shown and described herein.

FIG. 3 depicts a block diagram illustrating the combination of uncertainty levels for various data streams, according to one or more embodiments shown and described herein. Combining the uncertainty levels of driving data streams may include weighted averaging, multiplication, or summation. According to some embodiments, a totalizer 310 may be configured to combine uncertainties corresponding to data streams based on sweeping a vehicle path 302 through an occupancy grid. An occupancy grid may include a set of locations representing physical space from around the vehicle. Each location in the occupancy grid through which the vehicle path 302 passes may be associated with one or more driving data streams 101-109 which each have a corresponding uncertainty level. The totalizer may be configured to combine the uncertainty levels from the driving data streams used to identify features in the vehicle path 302.

As a non-limiting example, an observation uncertainty level 301 of an observation driving data stream corresponding to the vehicle path may be combined with a motion prediction uncertainty level 303 of a motion prediction driving data stream corresponding to the vehicle path. A localization uncertainty level 305 of a localization data stream corresponding to the vehicle path may be combined with map uncertainty level 307 of a map data stream corresponding to the vehicle path. A totalizer 310 may combine two or more uncertainties 301, 303, 305, 307, including uncertainties of other data streams 309 to generate a total uncertainty 311. According to some embodiments, one or more autonomous functions may be enabled or disabled based on the total uncertainty 311. According to some embodiments, one or more autonomous functions may be enabled or disabled based on one or more of the observation uncertainty level 301, motion prediction uncertainty level 303, localization uncertainty level 305 map uncertainty level 307, or uncertainties levels of other data streams 309.

The process of enabling or disabling an autonomous function based on an uncertainty level of one or more data streams is described in greater detail with reference to FIG. 4.

Figure 4:
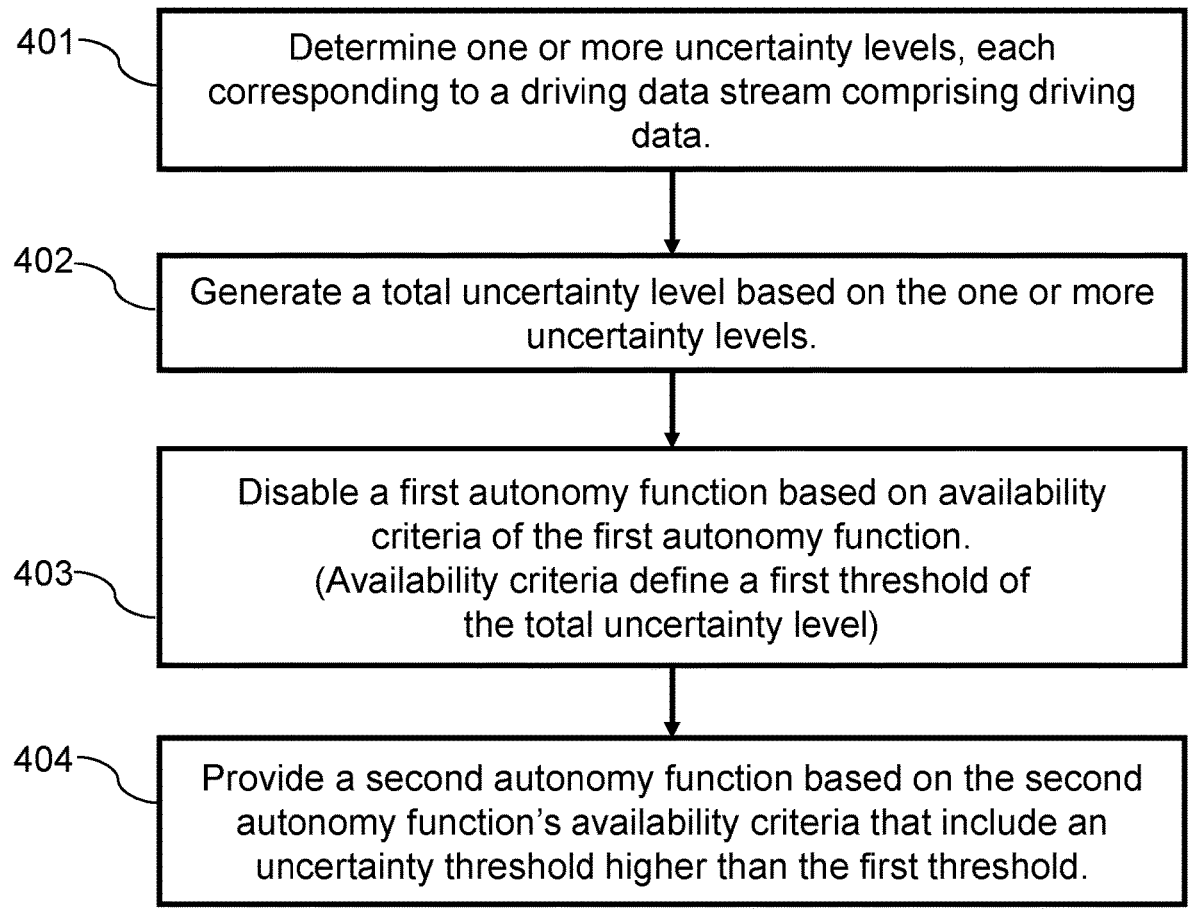
FIG. 4 depicts a flow chart of a method for controlling availability of autonomy functions of a vehicle, according to one or more embodiments shown and described herein.

FIG. 4 depicts a flow chart of a method for controlling availability of autonomy functions of a vehicle, according to one or more embodiments shown and described herein. The method steps illustrated in FIG. 4 may be performed by a computing device, according to embodiments described herein.

At step 401, the computing device may determine one or more uncertainty levels, each corresponding to a driving data stream comprising driving data. According to some embodiments, the one or more uncertainty levels may correspond to a probability of an undesirable outcome. According to some embodiments, an undesirable outcome includes a collision. A collision may include a collision with an obstacle or a collision with another vehicle. According to some embodiments, an undesirable outcome includes driving off the roadway. Driving off the roadway may be defined as any vehicle trajectory that performs an illegal maneuver, including but not limited to driving on a pathway reserved for pedestrians, driving the wrong direction on a roadway, performing an illegal turn, or physically leaving an area designated for vehicle traffic.

At step 402, the computing device may generate a total uncertainty level based on the one or more uncertainty levels. As discussed in relation to FIG. 3 above, a total uncertainty may be generated by combining uncertainty levels corresponding to one or more driving data streams 101-109. The generation of a total uncertainty is described in further detail with reference to FIG. 5.

At step 403, the computing device may disable a first autonomy function based on availability criteria of the first autonomy function. As described above in reference to FIG. 3, the availability criteria may define one or more thresholds corresponding to driving data streams. The availability criteria may define a first threshold for the total uncertainty level. According to some embodiments, the availability criteria may further define a second threshold for an uncertainty level corresponding to at least one of the driving data streams. According to some embodiments, the computing device may disable the first autonomous function in response to at least one of the first threshold or the second threshold being triggered. According to some embodiments, the computing device may disable the first autonomy function based on a total uncertainty. According to some embodiments, the computing device may disable the first autonomy function based on the uncertainty level of one or more driving data streams.

At step 404, the computing device may provide a second autonomous function based on the second autonomy function's availability criteria that include an uncertainty threshold higher than the first threshold. Thus one autonomous function of a driver assistance feature may be enabled based on a total uncertainty or based on the availability or uncertainty of one or more driving data streams, while another autonomous function of the driver assistance feature may be disabled.

Figure 5:
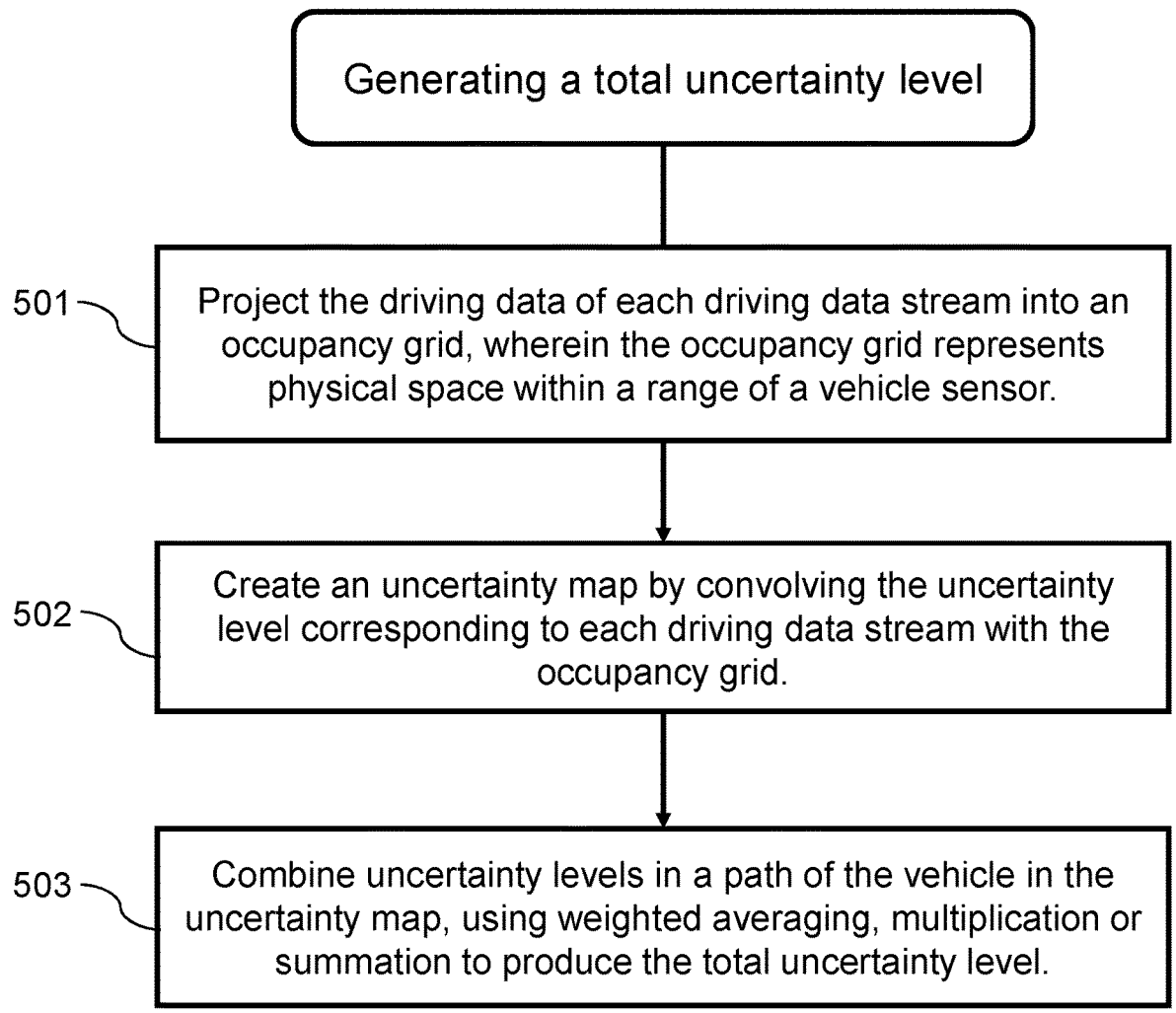
FIG. 5 depicts a flow chart of a method of generating a total uncertainty level, according to one or more embodiments shown and described herein.

FIG. 5 depicts a flow chart of a method of generating a total uncertainty level, according to one or more embodiments shown and described herein. The steps illustrated in FIG. 5 may be performed by a computing device as described herein.

At step 501, the computing device may project the driving data of each driving data stream into an occupancy grid. The occupancy grid may represent physical space within a range of a vehicle sensor. The occupancy grid may identify positions of various features of the physical space around the vehicle. Features of the physical space may include, but are not limited to, obstacles, lane centers, lane edges, other vehicles, available pathways for navigation, weather, or any other feature represented in driving data.

A step 502, the computing device may create an uncertainty map by convolving the uncertainty level corresponding to each driving data stream with the occupancy grid. The uncertainty map may then include location information of the occupancy grid and information corresponding to uncertainty of each of the driving data streams for the locations represented in the occupancy grid.

At step 503, the computing device may combine uncertainty levels in a vehicle path 302 through the uncertainty map to produce the total uncertainty level. The computing device may sweep the vehicle path 302 through the uncertainty map. The vehicle path 302 may pass through various locations of the uncertainty map and each location may correspond to one or more driving data streams and an uncertainty corresponding to the one or more driving data streams. The uncertainty values for the locations the vehicle path 302 passes through may be combined using weighted averaging, multiplication or summation to produce the total uncertainty level.

Figure 6:
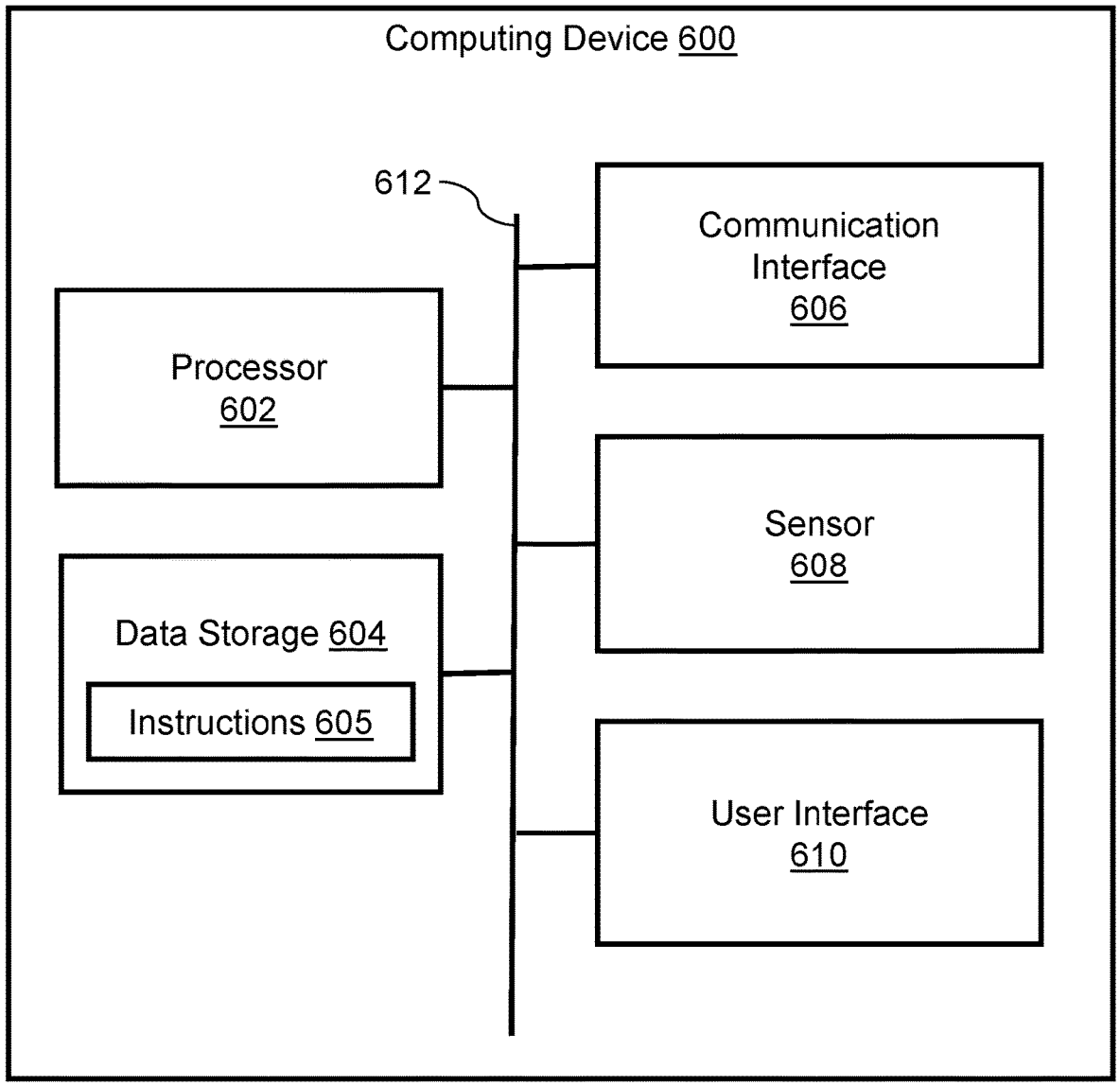
FIG. 6 depicts a block diagram of a computing device, according to one or more embodiments shown and described herein.

FIG. 6 depicts a block diagram of a computing device, according to one or more embodiments shown and described herein. As shown, a computing device 600 may include a processor 602, and data storage 604 including instructions 605. The computing device may further include a communication interface 606, a sensor 608, and a user interface 610, each of which are communicatively connected via a system bus 612. Any component or combination of components of the disclosed embodiments may take the form of or include a computing device 600. It should be understood that computing device 600 may include different and/or additional components, and some or all of the functions of a given component could instead be carried out by one or more different components. Additionally, computing device 600 could take the form of (or include) a plurality of computing devices, and some or all of the functions of a given component could be carried out by any combination of one or more of the computing devices in the plurality.

Processor 602 may take the form of one or more general-purpose processors and/or one or more special-purpose processors, and may be integrated in whole or in part with data storage 604, communication interface 606, sensor 608, user interface 610, and/or any other component of computing device 600, as examples. Accordingly, processor 602 may take the form of or include a controller, an integrated circuit, a microchip, a central processing unit (CPU), a microprocessor, a system on a chip (SoC), a field-programmable gate array (FPGA), and/or an application-specific integrated circuit (ASIC), among other possibilities.

Data storage 604 may take the form of a non-transitory computer-readable storage medium such as a hard drive, a solid-state drive, an erasable programmable read-only memory (EPROM), a universal serial bus (USB) storage device, a compact disc read-only memory (CD-ROM) disk, a digital versatile disc (DVD), a relational database management system (RDBMS), any other non-volatile storage, or any combination of these, to name just a few examples.

Instructions 605 may be stored in data storage 604, and may include machine-language instructions executable by processor 602 to cause computing device 600 to perform the computing-device functions described herein. Additionally or alternatively, instructions 605 may include script instructions executable by a script interpreter configured to cause processor 602 and computing device 600 to execute the instructions specified in the script instructions. In an embodiment, the instructions include instructions executable by the processor to cause the computing device to execute an artificial neural network. It should be understood that instructions 605 may take other forms as well.

Additional data may be stored in data storage 604, such as observed vehicle trajectories, indicated similarities and/or classifications of observed vehicle trajectories, an intermediate space of intermediate representations of observed vehicle trajectories, and/or network parameters of a neural network, as will be described in further detail below. The additional data could be stored such as a table, a flat file, data in a filesystem of the data storage, a heap file, a B+ tree, a hash table, a hash bucket, or any combination of these, as examples.

Communication interface 606 may be any component capable of performing the communication-interface functions described herein, including facilitating wired and/or wireless communication between computing device 600 and another entity. As such, communication interface 606 could take the form of an Ethernet, Wi-Fi, Bluetooth, and/or USB interface, among many other examples. Communication interface 606 may receive data over a network via communication links, for instance.

Sensor 608 could take the form of one or more sensors operable to perform any of the sensor functions described herein. The sensor could be positioned on a vehicle, including an interior and/or exterior of a vehicle. Though sensor 608 may be referenced in the singular throughout this disclosure, it should be understood that sensor 608 may take the form of (or include) a single sensor or multiple sensors.

The sensor could include a radar sensor, a LIDAR sensor, a camera, an accelerometer, a speedometer, or any combination of these or other sensors. The radar sensor, LIDAR sensor, and/or camera may obtain signals (such as electromagnetic radiation) that can be used by computing device 600 to obtain information regarding a road agent and/or other objects in an environment of a vehicle or other entity of the disclosed embodiments. For example, the radar sensor and/or LIDAR sensor may send a signal (such as pulsed laser light or radio waves) and may obtain a distance measurement from the sensor to the surface of a road agent or other object based on a time of flight of the signal—that is, the time between when the signal is sent and when the reflected signal (reflected by the object surface) is received by the sensor. The camera may collect light or other electromagnetic radiation and may generate an image representing a trajectory of a road agent or an environment of a system entity based on the collected radiation. Additionally or alternatively, the accelerometer and the speedometer may be used to detect an acceleration and a speed of a road agent, respectively. Sensor 608 may take other forms as well.

User interface 610 may be any component capable of carrying out the user-interface functions described herein. For example, the user interface may be configured to receive input from a user and/or output information to the user. Output may be provided via a computer monitor, a loudspeaker (such as a computer speaker), or another component of (or communicatively linked to) computing device 600. User input might be achieved via a keyboard, a mouse, or other component communicatively linked to the computing device. As another possibility, input may be realized via a touchscreen display of the computing device in the form of a smartphone or tablet device. Some components may provide for both input and output, such as the aforementioned touchscreen display. It should be understood that user interface 610 may take numerous other forms as well.

System bus 612 may be any component capable of performing the system-bus functions described herein. In an embodiment, system bus 612 is any component configured to transfer data between processor 602, data storage 604, communication interface 606, sensor 608, user interface 610, and/or any other component of computing device 600. In an embodiment, system bus 612 includes a traditional bus as is known in the art. In other embodiments, system bus 612 includes a serial RS-232 communication link, a USB communication link, and/or an Ethernet communication link, alone or in combination with a traditional computer bus, among numerous other possibilities. In some examples, system bus 612 may be formed from any medium that is capable of transmitting a signal, such as conductive wires, conductive traces, or optical waveguides, among other possibilities. Moreover, system bus 612 may be formed from a combination of mediums capable of transmitting signals. The system bus could take the form of (or include) a vehicle bus, such as a local interconnect network (LIN) bus, a controller area network (CAN) bus, a vehicle area network (VAN) bus, or any combination of these or mediums. It should be understood that system bus 612 may take various other forms as well.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for controlling availability of autonomy functions of a vehicle, the method comprising:
   determining one or more uncertainty levels, each corresponding to a driving data stream comprising driving data, wherein the uncertainty levels correspond to a probability of an undesirable outcome;
   generating a total uncertainty level based on the one or more uncertainty levels; and
   disabling a driver assistance feature comprising an adaptive cruise control that includes a plurality of autonomy functions including a first autonomy function based on availability criteria of the first autonomy function, the plurality of autonomy functions further including a second autonomy function; and
   enabling a second driver assistance feature when the first autonomy function and the second autonomy function of the driver assistance feature are disabled based on a first uncertainty level for the first autonomy function and a second uncertainty level for the second autonomy function,
   wherein the first uncertainty level includes its own respective threshold that is triggered and the second uncertainty level includes its own respective threshold is triggered, the first uncertainty level and the second uncertainty level being defined in a respective availability criteria, and the first uncertainty level corresponding to a first driving data stream and the second uncertainty level corresponding to a second driving data stream,
   wherein the availability criteria define a first threshold of the total uncertainty level, wherein the first autonomy function remains enabled when the second autonomy function is disabled, and wherein the first autonomy function includes a lane keeping autonomous function, the second autonomy function includes a following distance autonomy function, and the second driver assistance feature comprises basic cruise control.

2. The method of claim 1, wherein the availability criteria further define a second threshold of an uncertainty level corresponding to at least one of the driving data streams, and wherein the disabling of the driver assistance feature including the first autonomy function is performed in response to at least one of the first threshold or the second threshold being triggered.

3. The method of claim 1, further comprising providing the second autonomy function of the plurality of autonomy functions based on the second autonomy function's availability criteria that include a total uncertainty threshold higher than the first threshold.

4. The method of claim 1, wherein the generating of a total uncertainty level comprises:

projecting the driving data of each driving data stream into an occupancy grid, wherein the occupancy grid including a set of locations that represent physical space within a range of a vehicle sensor, each location in the occupancy grid associated with the driving data stream;

creating an uncertainty map by convolving the uncertainty level corresponding to each driving data stream with the occupancy grid; and combining uncertainty levels in a path of the vehicle in the uncertainty map to produce the total uncertainty level.

5. The method of claim 4, wherein the combining comprises one or more of weighted averaging, multiplication, or summation.

6. The method of claim 1, wherein the undesirable outcome comprises a collision or leaving a roadway.

7. The method of claim 1, wherein driving data comprises one or more of sensor data, map data, trajectory data, location data, and wherein sensor data comprises camera data, image device data, audio data, sonar data, LIDAR data, RADAR data, obstacle detection data, throttle data, steering data, or any data from a vehicle sensor.

8. The method of claim 1, further comprising re-enabling one or more of the first autonomy function or the second autonomy function in response to satisfying the respective availability criteria.

9. A system for controlling availability of autonomy functions of a vehicle, the system comprising:

a processor; and memory storing instructions that, when executed by the processor cause the processor to perform the steps of:

determining one or more uncertainty levels, each corresponding to a driving data stream comprising driving data, wherein the uncertainty levels correspond to a probability of an undesirable outcome;

generating a total uncertainty level based on the one or more uncertainty levels;

disabling a driver assistance feature comprising an adaptive cruise control that includes a plurality of autonomy functions including a first autonomy function based on availability criteria of the first autonomy function, the plurality of autonomy functions further including a second autonomy function; and enabling a second driver assistance feature when the first autonomy function and the second autonomy function of the driver assistance feature are disabled based on a first uncertainty level for the first autonomy function and a second uncertainty level for the second autonomy function, wherein the first uncertainty level includes its own respective threshold that is triggered and the second uncertainty level includes its own respective threshold is triggered, the first uncertainty level and the second uncertainty level being defined in a respective availability criteria, and the first uncertainty level corresponding to a first driving data stream and the second uncertainty level corresponding to a second driving data stream, wherein the availability criteria define a first threshold of the total uncertainty level, wherein the first autonomy function remains enabled when the second autonomy function is disabled, and wherein the first autonomy function includes a lane keeping autonomous function, the second autonomy function includes a following distance autonomy function, and the second driver assistance feature comprises basic cruise control.

10. The system of claim 9, wherein the availability criteria further define a second threshold of an uncertainty level corresponding to at least one of the driving data streams, and wherein the disabling of the driver assistance feature including the first autonomy function is performed in response to at least one of the first threshold or the second threshold being triggered.

11. The system of claim 9, wherein the instructions further cause the processor to perform the steps of:

providing the second autonomy function of the plurality of autonomy functions based on the second autonomy function's availability criteria that include a total uncertainty threshold higher than the first threshold.

12. The system of claim 9, wherein the generating of a total uncertainty level comprises:

projecting the driving data of each driving data stream into an occupancy grid, wherein the occupancy grid including a set of locations that represent physical space within a range of a vehicle sensor, each location in the occupancy grid associated with the driving data stream;

creating an uncertainty map by convolving the uncertainty level corresponding to each driving data stream with the occupancy grid; and combining uncertainty levels in a path of the vehicle in the uncertainty map to produce the total uncertainty level.

13. The system of claim 9, wherein the undesirable outcome comprises a collision or leaving a roadway.

14. The system of claim 9, wherein driving data comprises one or more of sensor data, map data, trajectory data, or location data;

wherein sensor data comprises data from the vehicle sensor; and wherein the vehicle sensor comprises one or more of a camera, image device, audio sensor, sonar sensor, LIDAR device, RADAR device, obstacle detection device, throttle sensor, steering sensor, or any sensor of an autonomous vehicle.

15. The system of claim 9, wherein the instructions further cause the processor to perform the step of re-enabling one or more of the first autonomy function or the second autonomy function in response to satisfying the respective availability criteria.

16. A non-transitory computer-readable medium storing instructions that, when executed by a processor, cause the processor to perform a method for controlling availability of autonomy functions of a vehicle, the method comprising:
    determining one or more uncertainty levels, each corresponding to a driving data stream comprising driving data, wherein the uncertainty levels correspond to a probability of an undesirable outcome;
    generating a total uncertainty level based on the one or more uncertainty levels;
    disabling a driver assistance feature comprising an adaptive cruise control that includes a plurality of autonomy functions including a first autonomy function based on availability criteria of the first autonomy function, the plurality of autonomy functions further including a second autonomy function; and
    enabling a second driver assistance feature when the first autonomy function and the second autonomy function of the driver assistance feature are disabled based on a first uncertainty level for the first autonomy function and a second uncertainty level for the second autonomy function,
    wherein the first uncertainty level includes its own respective threshold that is triggered and the second uncertainty level includes its own respective threshold is triggered, the first uncertainty level and the second uncertainty level being defined in a respective availability criteria, and the first uncertainty level corresponding to a first driving data stream and the second uncertainty level corresponding to a second driving data stream,
    wherein the availability criteria define a first threshold of the total uncertainty level,
    wherein the first autonomy function remains enabled when the second autonomy function is disabled, and
    wherein the first autonomy function includes a lane keeping autonomous function, the second autonomy function includes a following distance autonomy function, and the second driver assistance feature comprises basic cruise control.

17. The non-transitory computer-readable medium of claim 16, wherein the availability criteria further define a second threshold of an uncertainty level corresponding to at least one of the driving data streams, and
    wherein the disabling of the driver assistance feature including the first autonomy function is performed in response to at least one of the first threshold or the second threshold being triggered.

18. The non-transitory computer-readable medium of claim 16, further comprising providing the second autonomy function of the plurality of autonomy functions based on the second autonomy function's availability criteria that include a total uncertainty threshold higher than the first threshold.

19. The non-transitory computer-readable medium of claim 16, wherein the generating of a total uncertainty level comprises:
    projecting the driving data of each driving data stream into an occupancy grid, wherein the occupancy grid including a set of locations that represent physical space within a range of a vehicle sensor, each location in the occupancy grid associated with the driving data stream;
    creating an uncertainty map by convolving the uncertainty level corresponding to each driving data stream with the occupancy grid; and
    combining uncertainty levels in a path of the vehicle in the uncertainty map to produce the total uncertainty level.

20. The non-transitory computer-readable medium of claim 16, the method further comprising re-enabling one or more of the first autonomy function or the second autonomy function in response to satisfying the respective availability criteria.

* * * * *